US007730988B2

(12) United States Patent
Igarashi et al.

(10) Patent No.: US 7,730,988 B2
(45) Date of Patent: Jun. 8, 2010

(54) REAR WHEEL SUSPENSION FOR A MOTORCYCLE AND SWING ARM ATTACHMENT STRUCTURE FOR A MOTORCYCLE

(75) Inventors: Makoto Igarashi, Saitama (JP); Shinji Takayanagi, Saitama (JP); Toshiaki Takamura, Saitama (JP); Tsuyoshi Tsuda, Saitama (JP); Koshi Hayakawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 43 days.

(21) Appl. No.: 12/051,460

(22) Filed: Mar. 19, 2008

(65) Prior Publication Data

US 2008/0230293 A1 Sep. 25, 2008

(30) Foreign Application Priority Data

Mar. 22, 2007 (JP) ............................ 2007-074868
Mar. 22, 2007 (JP) ............................ 2007-074869

(51) Int. Cl.
*B62K 25/26* (2006.01)

(52) U.S. Cl. ...................................... 180/227; 280/285

(58) Field of Classification Search ................. 180/227; 280/283, 284, 285, 286, 288
See application file for complete search history.

(56) References Cited

U.S. PATENT DOCUMENTS 4,058,181 A * 11/1977 Buell ......................... 180/227
4,433,747 A * 2/1984 Offenstadt .................. 180/227
4,463,824 A * 8/1984 Boyesen ..................... 180/227
4,697,824 A * 10/1987 Tagami ....................... 280/284
4,951,791 A * 8/1990 Belil Creixelli ............. 180/219
6,189,638 B1 * 2/2001 Ito et al. ..................... 180/227
6,279,703 B1 * 8/2001 Mete ....................... 188/319.1
6,293,574 B1 * 9/2001 Storck ........................ 280/284
6,450,282 B1 * 9/2002 Gogo et al. ................. 180/219
6,527,289 B2 * 3/2003 Parigian ..................... 280/284
6,913,101 B2 * 7/2005 Uneta et al. ................. 180/227
2006/0033306 A1 * 2/2006 Sanchez ..................... 280/283
2006/0278458 A1 * 12/2006 Toyoda ....................... 180/227

FOREIGN PATENT DOCUMENTS

JP 1-34830 B2 7/1989
JP 05105170 A * 4/1993
JP 2564078 B2 9/1996
JP 2004-352209 12/2004

* cited by examiner

*Primary Examiner*—Lesley Morris
*Assistant Examiner*—Wesley Potter
(74) *Attorney, Agent, or Firm*—Birch, Stewart, Kolasch & Birch, LLP

(57) ABSTRACT

A rear wheel suspension for a motorcycle can sufficiently ensure the stroke of a rear cushion and can enhance traveling performance of a vehicle by lowering the gravity center of the vehicle. A swing arm includes an upper arm swingably connecting a body frame with the upper portion of a power transmission portion. A lower arm swingably connects the body frame with the lower portion of the power transmission portion. The axial center of the upper end support portion of a rear cushion is swingably supported by the upper arm at a position forward of the axial center of the support portion. The axial center of the lower support portion of the rear cushion can swingably be supported by the lower arm at a position rearward of the axial center of the support portion swingably supporting the lower arm and the body frame with respect to the vehicle.

10 Claims, 10 Drawing Sheets

Rr
U
D
Fr
32
35
31
44
32a
P2
63
34
46
32b
P5
73
30
41
42
40
55
75
52
51
57
50
P6
74
80
81
53
43
Z
P1
20
60
21
65
P3
56
54
45
70
P4

Rr
U
D
Fr
32
35
31
44
32a
P2
63
34
30
46
32b
P5
73
41
42
40
55
75
57
P6
74
80
81
50
52
51
53
43
P1
20
21
60
65
P3
56
54
45
70
P4

10
20
21
22
23
24
25
S
30
31
32
32a
32b
34
35
40
41
42
43
44
45
46
50
51
52
53
54
55
56
57
65
74
75
11
11a
12
13
C
C
U
D
Fr
Rr 20
21
21a
83
82
80
81
84
60f
60c
60b
41
40
60
60d
60e
60a
43
44
R
U
D
L
70f
70c
70b
70d
70
42
70e
70a
21b
85

REAR WHEEL SUSPENSION FOR A MOTORCYCLE AND SWING ARM ATTACHMENT STRUCTURE FOR A MOTORCYCLE

CROSS-REFERENCE TO RELATED APPLICATIONS

This nonprovisional application claims priority under 35 U.S.C. §119(a) on Patent Application Nos. 2007-074868 and 2007-074869, filed in Japan on Mar. 22, 2007. The entirety of each of the above-identified applications is incorporated herein by reference.

FIELD OF THE INVENTION

The present invention relates generally to rear wheel suspensions for a motorcycle and more particularly to a rear wheel suspension for a motorcycle including a swing arm rotatably supporting a rear wheel and a rear cushion attached to the swing arm.

The present invention also relates generally to a swing arm attachment structure for a motorcycle and more particularly to an attachment structure for a swing arm of a parallel link structure having a pair of upper and lower arms.

DESCRIPTION OF BACKGROUND ART

There have been known respective rear wheel suspensions for a motorcycle in which a rear cushion is laid at the upper portion of a vehicle body so as to extend in the back and forth direction of the vehicle body (see e.g. Japanese Patent Publication No. Hei 1-34830) and in which a rear cushion is disposed to extend in the up-and-down direction of the vehicle body (see e.g. Japanese Patent Laid-open No. 2004-352209).

In the rear wheel suspension of the motorcycle described in Japanese Patent Publication No. Hei 1-34830 mentioned above, the rear cushion is disposed horizontally in the back and forth direction. Therefore, the space occupied by a rear cushion mechanism can be reduced and the stroke of the rear cushion is ensured to enhance shock absorption. However, a link member is needed to make an acting direction of shock from a road surface horizontal in the back and forth direction. In addition, since the rear cushion is disposed at the upper portion of the vehicle body, there is a problem in that the gravity center of the vehicle should be lowered.

In the rear wheel suspension of the motorcycle in described Japanese Patent Laid-open No. 2004-352209 mentioned above, the rear cushion is disposed vertically with respect to the vehicle body. Therefore, there is a problem in that such arrangement provides limitation when the stroke of the rear cushion is intended to be increased.

There has also been known a swing arm attachment structure for a motorcycle widthwise gap defined between a body frame and the swing arm by axially moving an adjusting collar fitted to a support shaft (see Japanese Patent No. 2564078).

In the swing arm attachment structure for a motorcycle described in Japanese Patent No. 2564078, a single swing arm is only swingably supported by a body frame but a swing arm attachment structure of a parallel link structure having two arms are not taken into consideration at all.

For the single swing arm, it is only needed that it is merely possible to adjust the vehicle-widthwise gap defined between the body frame and the single swing arm. For the swing arm of the parallel link structure, however, it is needed that the vehicle- widthwise gap between the body frame and two arms can be adjusted while adjusting the vehicle-widthwise relative positions of the two arms. Taking into account the assembly performance of the swing arms, it is desirable that the gap can be adjusted from the lateral side of the vehicle body.

SUMMARY OF THE INVENTION

The present invention has been made to solve the problems associated with Japanese Patent Publication No. Hei 1-34830 and Japanese Patent Laid-open No. 2004-352209. It is therefore an object of the present invention to provide a rear wheel suspension for a motorcycle that can sufficiently ensure the stroke of a rear cushion and that can enhance traveling performance of a vehicle by lowering the gravity center of the vehicle.

To achieve the above object, according to a first aspect of the present invention, a rear wheel suspension for a motorcycle includes: a swing arm swingably supported by a body frame; a rear cushion for absorbing shock acting on a rear wheel; and a power transmission portion for transmitting a drive force from a power unit to the rear wheel; the swing arm includes an upper arm swingably connecting the body frame with an upper portion of the power transmission portion, and a lower arm swingably connecting the body frame with the lower portion of the power transmission portion; an axial center of an upper end support portion of the rear cushion is swingably supported by the upper arm at a position forward of an axial center of a first pivot pipe swingably supporting the upper arm with respect to the body frame of the vehicle; and an axial center of a lower end support portion of the rear cushion can swingably be supported by the lower arm at a position rearward of an axial center of a second pivot pipe swingably supporting the lower arm with respect to the body frame of the vehicle.

According to a second aspect of the present invention, the upper arm is formed integrally with a cushion attachment portion for swingably supporting an upper end portion of the rear cushion.

According to a third aspect of the present invention, the upper arm includes a left upper arm disposed on the left side of the vehicle body and a right upper arm disposed on the right side of the vehicle body, the lower arm includes a left lower am disposed on the left side of the vehicle body and a right lower arm disposed on the right side of the vehicle body, and the rear cushion is disposed at an approximately central position, in a vehicle-widthwise direction, of the left and right upper arms and of the left and right lower arms.

According to a fourth aspect of the present invention, the rear cushion includes a damping force adjusting mechanism and a damping force adjusting portion of the damping force adjusting mechanism is provided on a lower portion of the rear cushion to face the front of the vehicle.

According to a fifth aspect of the present invention, one of the left lower arm and the right lower arm is formed in a downwardly curved shape and the other is formed in an upwardly curved shape.

According to the first aspect of the present invention, the swing arm includes the upper arm swingably connecting the body frame with the upper portion of the power transmission portion, and the lower arm swingably connecting the body frame with the lower portion of the power transmission portion, the axial center of the upper end support portion of the rear cushion is swingably supported by the upper arm at a position forward of an axial center of a first pivot pipe swingably supporting the upper arm with respect to the body frame of the vehicle, and the axial center of the lower end support portion of the rear cushion can swingably be supported by the lower arm at a position rearward of the axial center of a second pivot pipe swingably supporting the lower arm with respect to the body frame of the vehicle. Thus, the stroke of the rear cushion can sufficiently be ensured. In addition, since the rear cushion can be disposed at the lower portion of the vehicle body, the gravity center of the vehicle can be lowered, thereby improving the traveling performance of the vehicle.

According to second aspect of the present invention, the upper arm is formed integrally with a cushion attachment portion for swingably supporting an upper end portion of the rear cushion. Therefore, the rear cushion is swung along with the swing of the swing arm to absorb shock acting on the rear wheel, thereby improving the traveling performance of the vehicle.

According to third aspect of the present invention, the upper arm includes a left upper arm disposed on the left side of the vehicle body and a right upper arm disposed on the right side of the vehicle body, the lower arm includes a left lower am disposed on the left side of the vehicle body and a right lower arm disposed on the right side of the vehicle body, and the rear cushion is disposed at an approximately central position, in a vehicle-widthwise direction, of the left and right upper arms and of the left and right lower arms. Thus, the rear cushion can absorb shock acting on the rear wheel in a balanced manner, thereby improving the traveling performance of the vehicle.

According to the fourth aspect of the present invention, the rear cushion includes the damping force adjusting mechanism and the damping force adjusting portion of the damping force adjusting mechanism is provided on a lower portion of the rear cushion to face the front of the vehicle. Thus, the damping force of the rear cushion can be adjusted without being influenced by the swing arm.

According to the fifth aspect of the present invention, one of the left lower arm and the right lower arm is formed in a downwardly curved shape and the other is formed in an upwardly curved shape. Thus, it is possible to prevent stress concentration from occurring at the lower arm, thereby improving durability of the rear wheel suspension.

The present invention has been made to solve problems associated with Japanese Patent No. 2564078. It is therefore an object of the present invention to provide a swing arm attachment structure for a motorcycle that can efficiently adjust the vehicle-widthwise gap between a body frame and a swing arm and can improve assembly performance of the swing arm even if the swing arm is of the parallel link structure.

To achieve the above object, according to a sixth aspect of the present invention, a swing arm attachment structure for a motorcycle includes: a body frame; a swing arm swingably supported by the body frame; and a power transmission portion for transmitting a drive force from a power unit to a rear wheel; the swing arm including an upper arm swingably supported by the body frame via a first support shaft and swingably connecting the body frame with an upper portion of the power transmission portion, and a lower arm swingably supported by the body frame via a second support shaft and swingably connecting the body frame with a lower portion of the power transmission portion. Adjuster mechanisms are respectively disposed on both axial sides of the first support shaft so as to be able to adjust a vehicle-widthwise gap between the body frame and the upper frame, and another adjuster mechanism is disposed on one axial side of the second support shaft so as to be able to adjust a vehicle-widthwise gap between the body frame and a lower arm.

According to a seventh aspect of the present invention, each of the adjuster mechanisms includes: an adjuster bolt comprising an insertion hole formed on an inner circumferential surface thereof adapted to receive the first or second support shafts inserted thereinto, and an external thread portion on an outer circumferential surface thereof threadedly engaged with an internal thread portion formed on the body frame; and a lock nut which is threadedly engaged with the external thread portion of the adjuster bolt to fix the adjuster bolt to the body frame.

According to an eighth aspect of the present invention, the body frame includes: a main frame supporting the power unit; a seat frame extending rearward from an approximately central portion, in the back and forth direction of a vehicle body, of the main frame; and a side frame extending rearward and upward from a rear end portion of the main frame; and the first support shaft is disposed inside a triangle area defined by the main frame, the seat frame and the side frame.

According to the sixth aspect of the present invention, the swing arm includes: the upper arm swingably supported by the body frame via the first support shaft and swingably connecting the body frame with the upper portion of the power transmission portion; and the lower arm swingably supported by the body frame via the second support shaft and swingably connecting the body frame with the lower portion of the power transmission portion. The adjuster mechanisms are respectively disposed on both axial sides of the first support shaft so as to be able to adjust the vehicle-widthwise gap between the body frame and the upper frame, and the other adjuster mechanism is disposed on one axial side of the second support shaft so as to be able to adjust the vehicle-widthwise gap between the body frame and the lower arm. The vehicle-widthwise gap between the body frame and the lower arm is adjusted by the adjuster mechanism located on the side of the lower arm. Thereafter, the vehicle-widthwise gap between the body frame and the upper arm can be adjusted while the vehicle-widthwise position of the upper arm is aligned with the position of the lower arm by the adjuster mechanisms located on the side of the upper arm. Thus, even if the swing arm is of a parallel link structure, the vehicle-widthwise gap between the body frame and the swing arm can efficiently be adjusted, thereby improving the assembly performance of the swing arm.

According to the seventh aspect of the present invention, each of the adjuster mechanisms includes: the adjuster bolt which is formed on the inner circumferential surface thereof with the insertion hole adapted to receive the first or second support shaft inserted thereinto and on the outer circumferential surface thereof with the external thread portion threadedly engaged with the internal thread portion formed on the body frame; and the lock nut which is threadedly engaged with the external thread portion of the adjuster bolt to fix the adjuster bolt to the body frame. Thus, the vehicle-widthwise position of the swing arm and the vehicle-widthwise gap between the body frame and the swing arm can be adjusted with ease, thereby improving the assembly performance of the swing arm.

According to the eighth aspect of the present invention, the body frame includes the main frame supporting the power unit; the seat frame extending rearward from the approximately central portion, in the back and forth direction of the vehicle body, of the main frame; and the side frame extending rearward and upward from the rear end portion of the main frame. In addition, the first support shaft is disposed inside the triangle area defined by the main frame, the seat frame and the side frame as viewed from the side of the vehicle body. Thus, the attachment of the swing arm and the gap adjustment can be performed easily and efficiently without interference with the frames and the like. Since the first support shaft is disposed near the center of the vehicle body, the total length of the vehicle body can be reduced and weight balance of the vehicle can be improved to enhance traveling performance.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of a rear wheel suspension for a motorcycle according to the present invention will hereinafter be described in detail with reference to the accompanying drawings. It is to be noted that the drawings should be viewed based on the direction of reference symbols.

Figure 1:
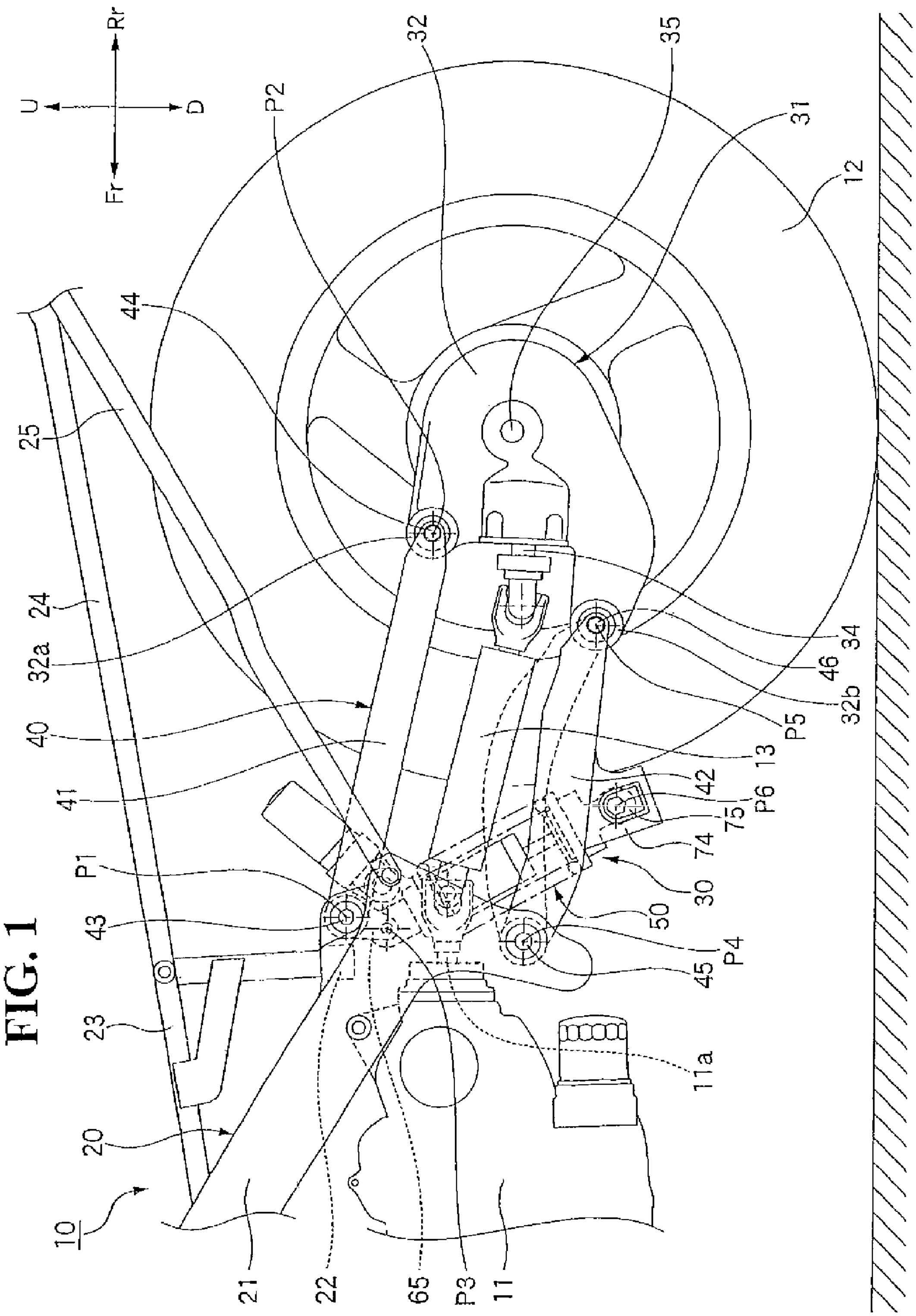
FIG. 1 is a lateral view of an essential portion of a motorcycle adopting a rear wheel suspension for a motorcycle according to the present invention.
Figure 2:
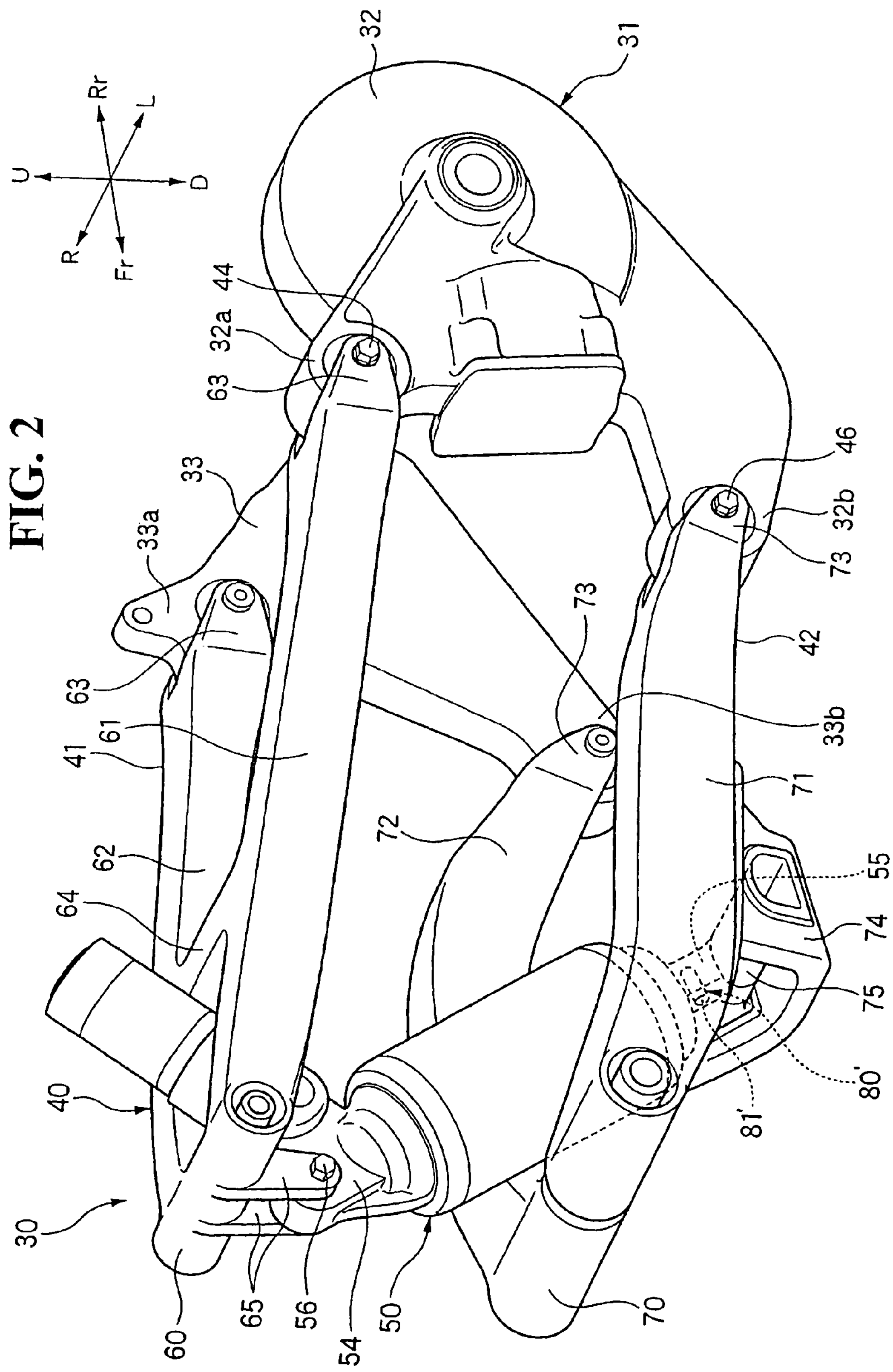
FIG. 2 is a perspective view of a rear wheel suspension shown in FIG. 1.
Figure 3A:
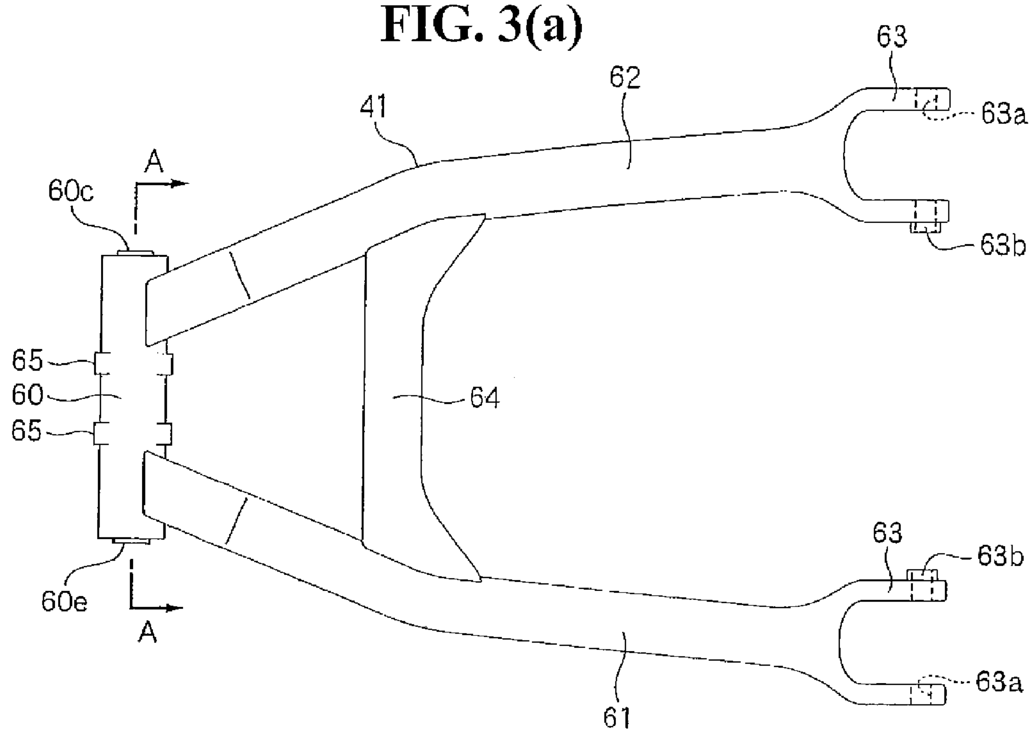
FIG. 3 includes views for assistance in explaining an upper arm, FIG. 3(*a*) is a plan view of the upper arm, FIG. 3(*b*) is a lateral view of the upper arm, and FIG. 3(*c*) is an enlarged cross-sectional view taken along line A-A of FIG. 3(*a*)
Figure 3B:
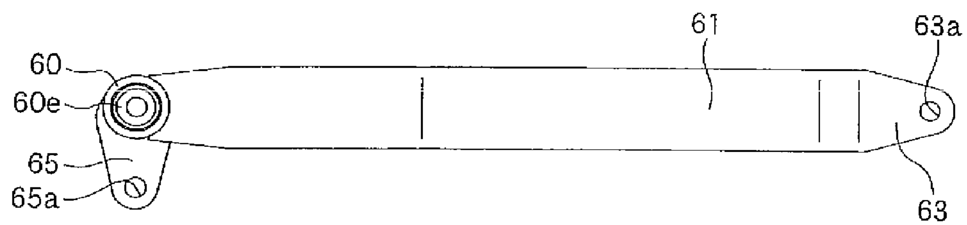
Figure 3C:
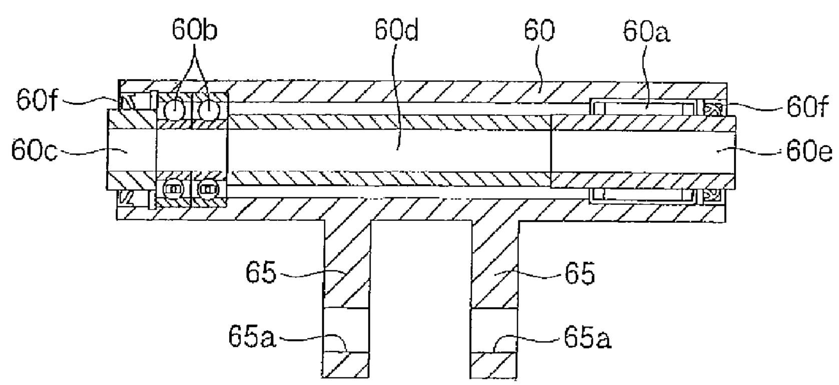
Figure 4A:
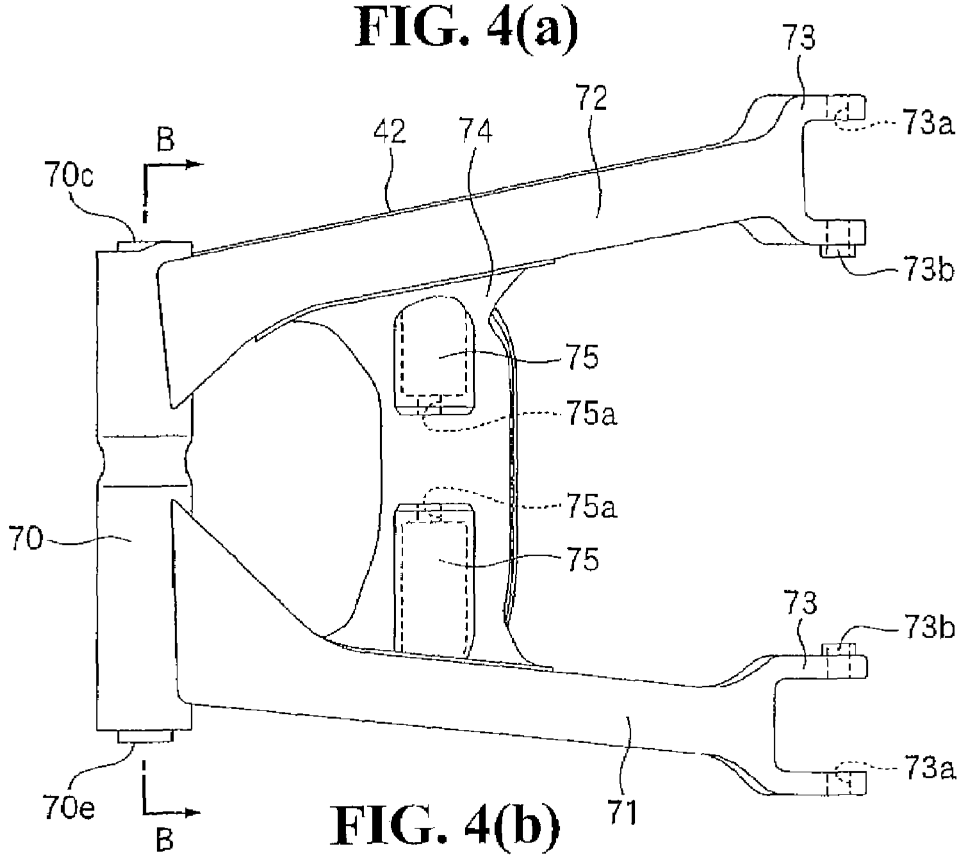
FIG. 4 includes views for assistance in explaining a lower arm, FIG. 4(*a*) is a plan view of the lower arm, FIG. 4(*b*) is a lateral view of the lower arm, and FIG. 4(*c*) is an enlarged cross-sectional view taken along line B-B of FIG. 4(*a*)
Figure 4B:
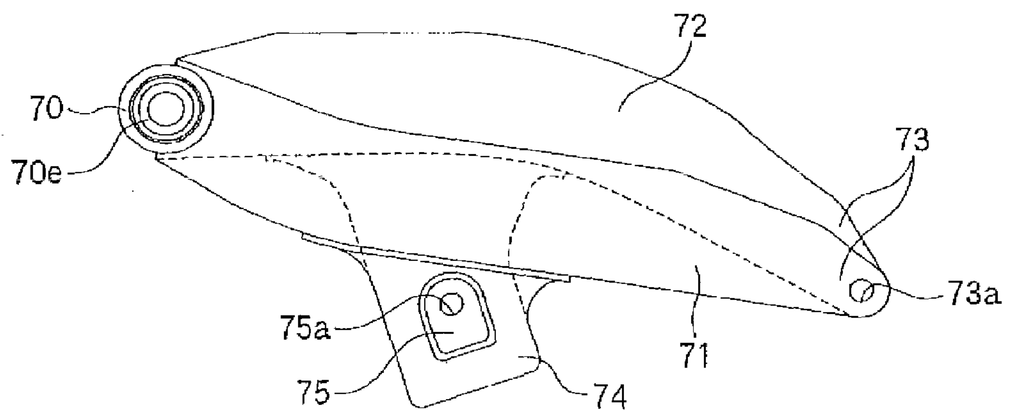
Figure 4C:
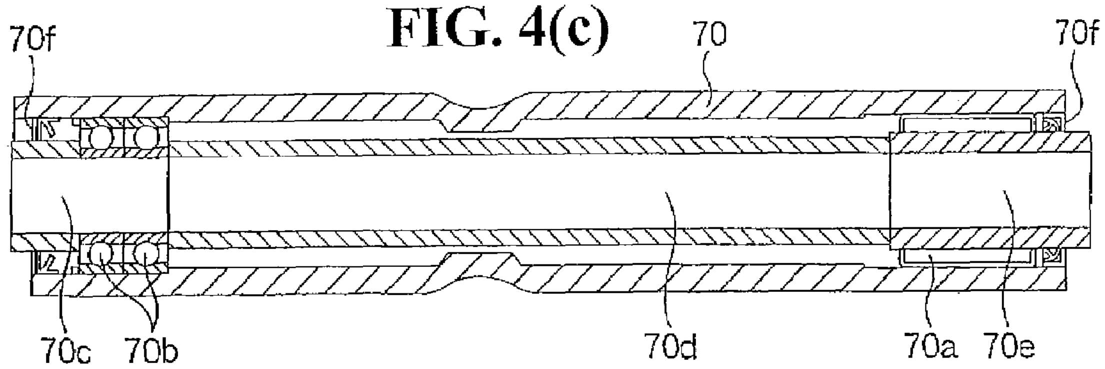
Figure 5:
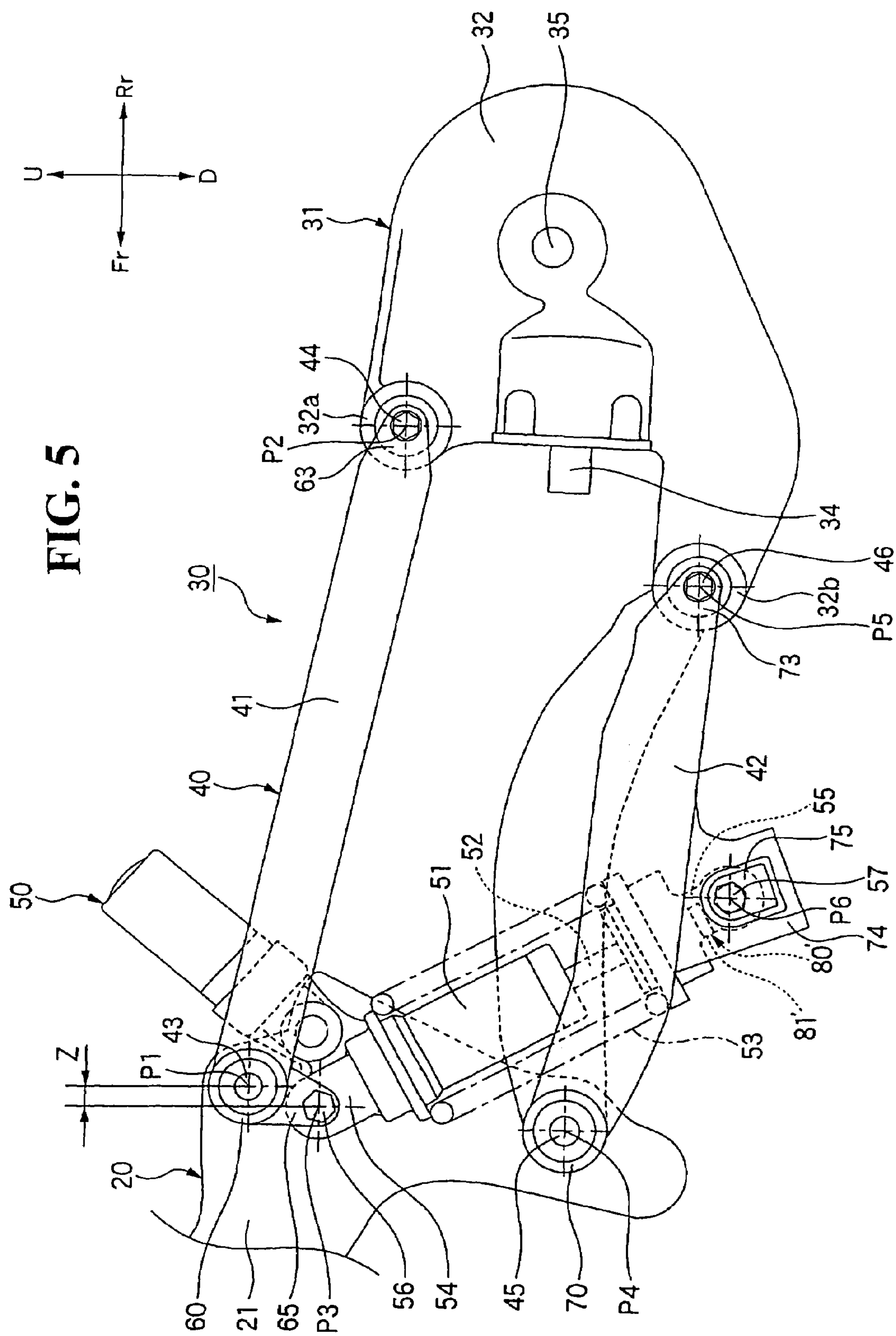
FIG. 5 is an enlarged lateral view of an essential portion for assistance in explaining the rear wheel suspension in a normal state.
Figure 6:
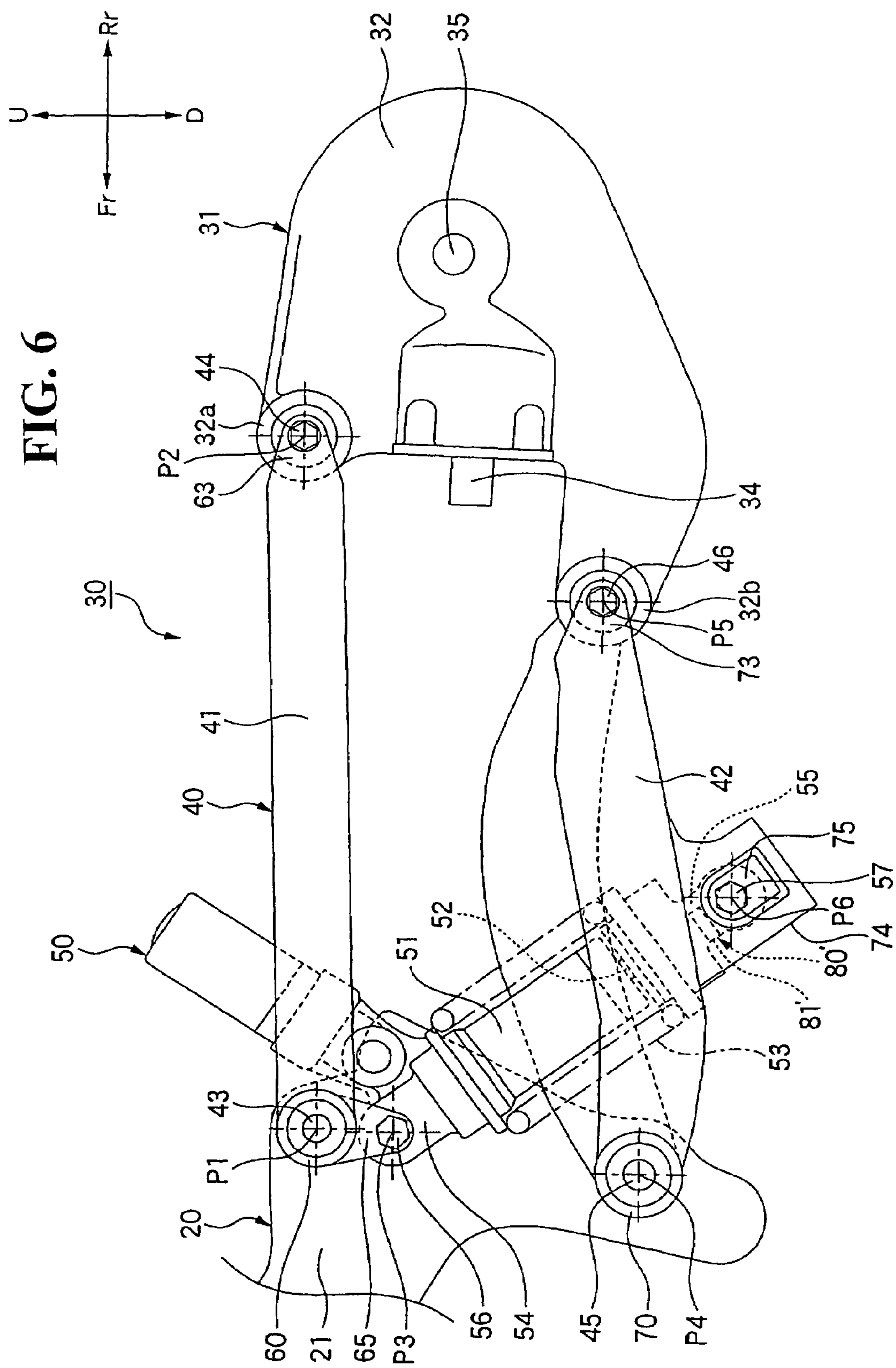
FIG. 6 is an enlarged lateral view of the essential portion for assistance in explaining the rear wheel suspension in a shock-absorbing state.
Figure 7:
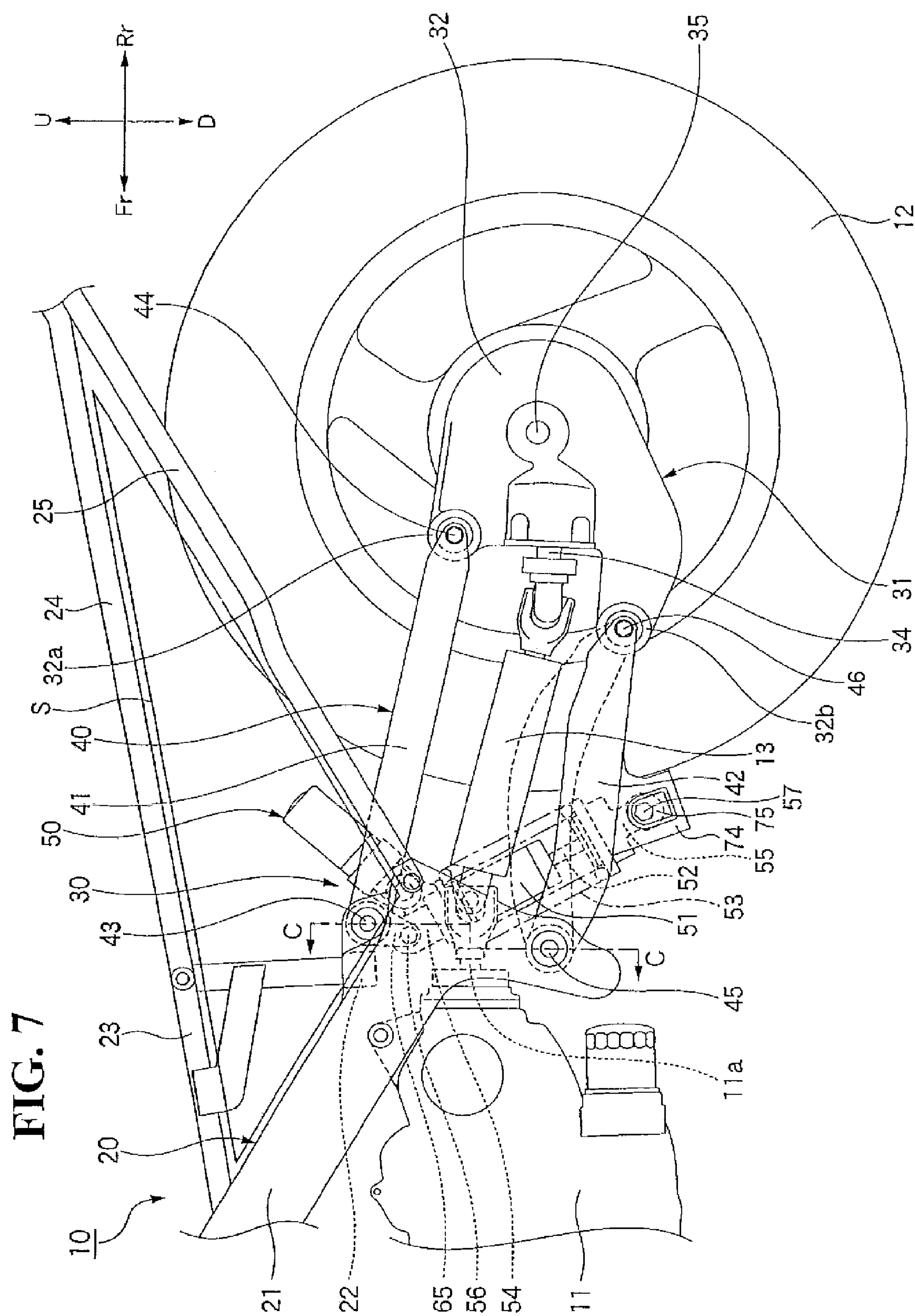
FIG. 7 is a lateral view of an essential portion of a motorcycle adopting a swing arm suspension structure for a motorcycle according to the present invention.
Figure 8:
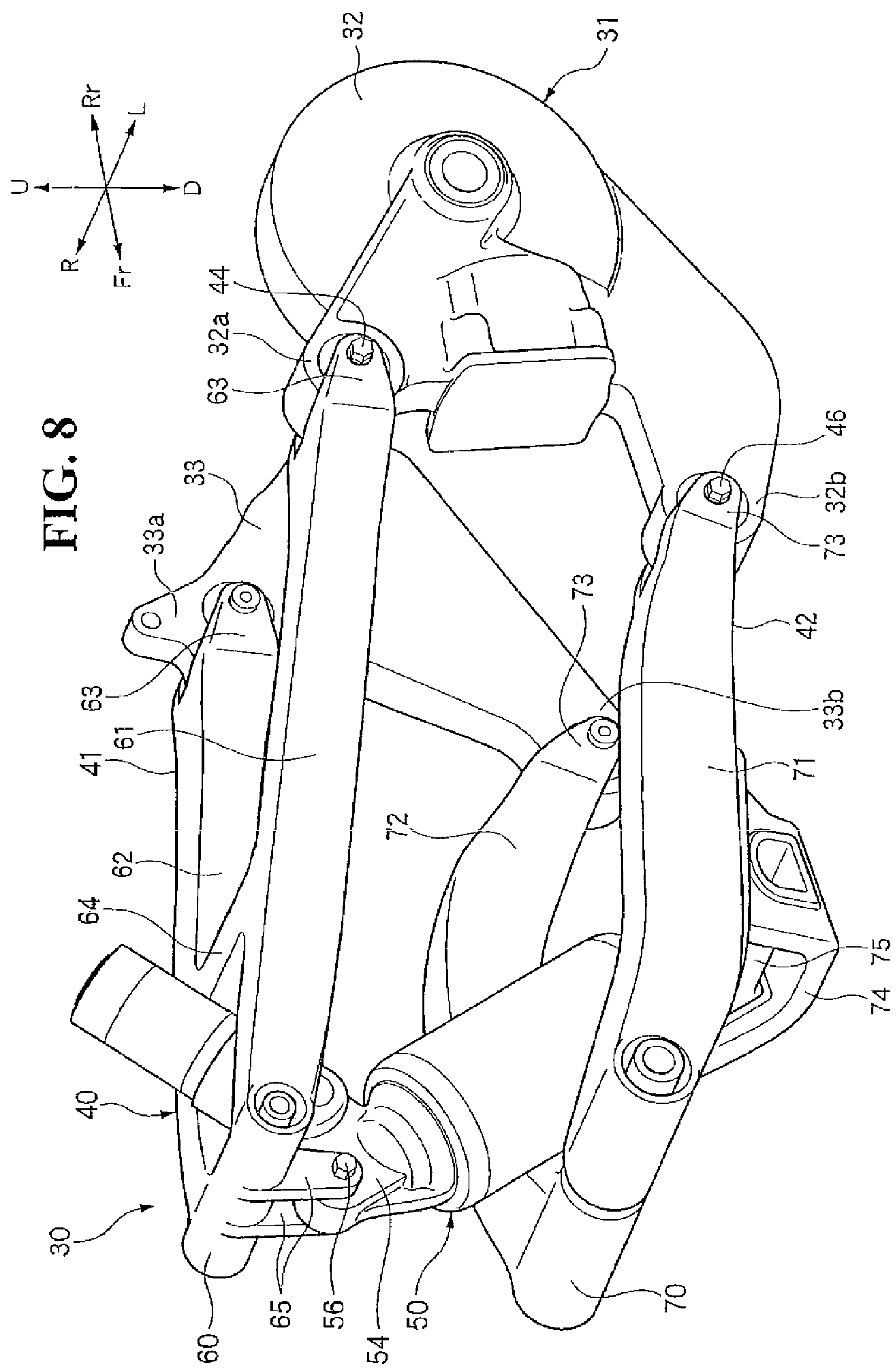
FIG. 8 is a perspective view of a rear wheel suspension shown in FIG. 6.
Figure 9:
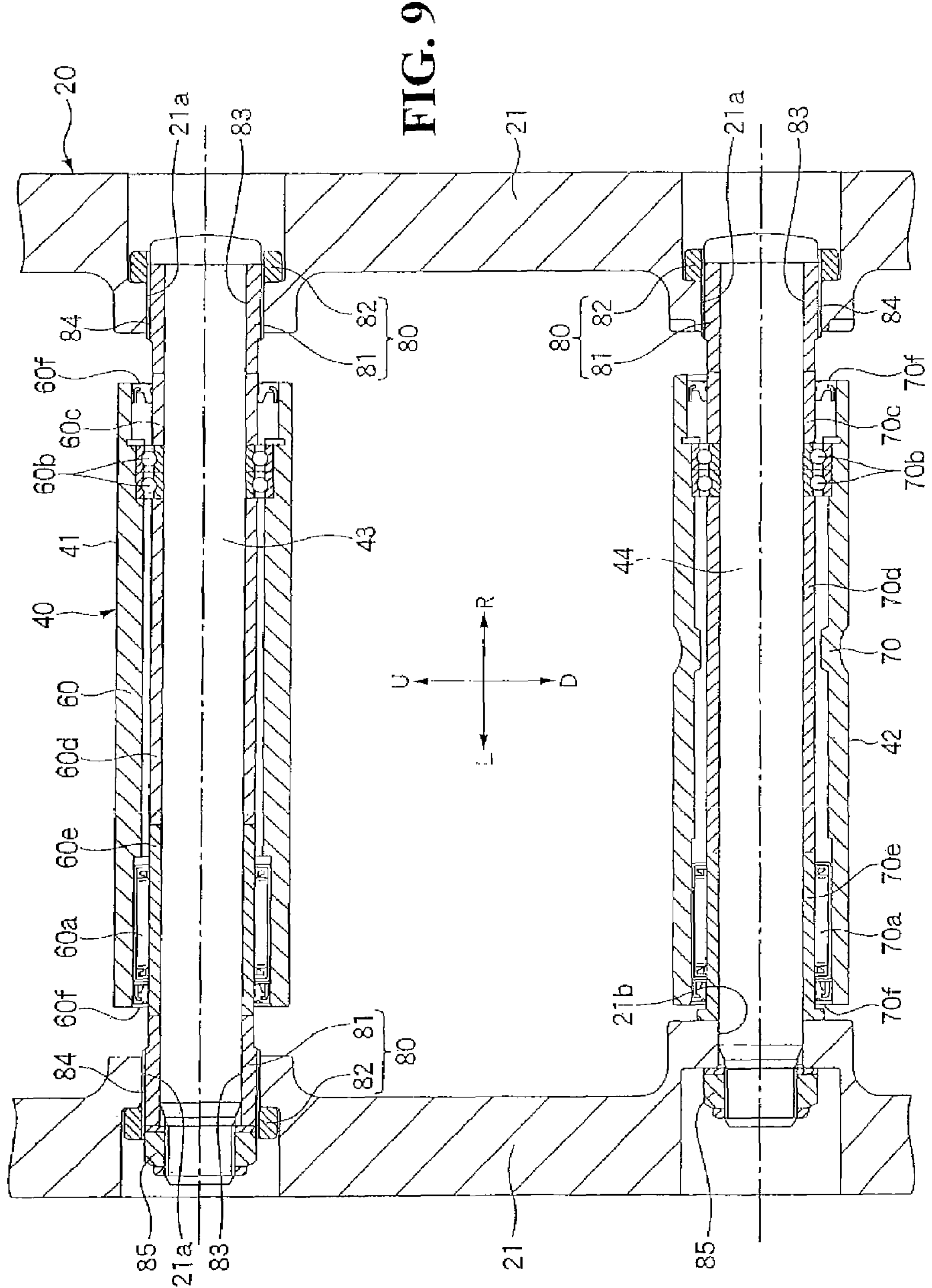
FIG. 9 is a cross-sectional view taken along line C-C of FIG. 7.
Figure 10:
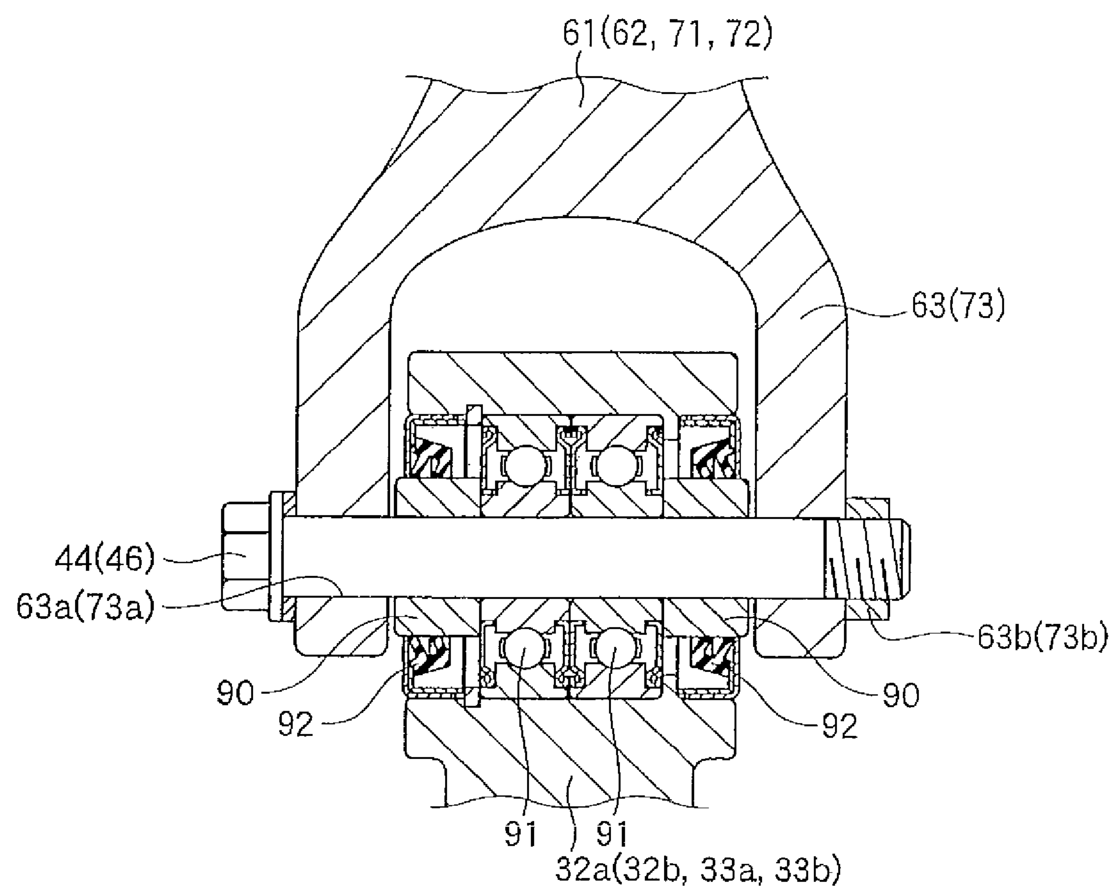
FIG. 10 is a cross-sectional view of an enlarged essential portion for assistance in explaining a joint portion between the upper arm and each of a drive gear case and a rear wheel support and between the lower arm and each of the drive gear case and the rear wheel support plate.

FIG. 1 is a lateral view of an essential portion of a motorcycle adopting a rear wheel suspension for a motorcycle according to the present invention. FIG. 2 is a perspective view of a rear wheel suspension shown in FIG. 1. FIG. 3 includes views for assistance in explaining an upper arm. FIG. 3(*a*) is a plan view of the upper arm, FIG. 3(*b*) is a lateral view of the upper arm, and FIG. 3(*c*) is an enlarged cross-sectional view taken along line A-A of FIG. 3(*a*). FIG. 4 includes views for assistance in explaining a lower arm. FIG. 4(*a*) is a plan view of the low arm, FIG. 4(*b*) is a lateral view of the lower arm and FIG. 4(*c*) is an enlarged cross-sectional view taken along line B-B of FIG. 4(*a*). FIG. 5 is an enlarged lateral view of an essential portion of the vehicle for assistance in explaining the rear wheel suspension in a normal state. FIG. 6 is an enlarged lateral view of the essential portion of the vehicle for assistance in explaining the rear wheel suspension in a shock-absorbing state. FIG. 7 is a lateral view of an essential portion of a motorcycle adopting a swing arm attachment structure for the motorcycle according to the present invention. FIG. 8 is a perspective view of a rear wheel suspension shown in FIG. 7. FIG. 9 is a cross-sectional view taken along line C-C of FIG. 7. FIG. 10 is a cross-sectional view of an enlarged essential portion for assistance in explaining a joint portion between the upper arm and each of a drive gear case and a rear wheel support and between the lower arm and each of the drive gear case and the rear wheel support plate.

In the following description, the front and the back or rear, the left and the right, and the upside and downside are based on a direction a rider faces. In addition, the front, the back or rear, the left and the right are denoted with "Fr", "Rr", "L", "R", "U" and "D", respectively.

First Embodiment

Referring to FIG. 1, a motorcycle 10 according to a first embodiment of the present invention will be described. The motorcycle 10 includes a body frame 20. A power unit 11 is attached to the body frame 20 from below and includes an internal combustion engine and a transmission. A rear wheel suspension 30 is swingably supported by the lower portion of the body frame 20. A rear wheel 12 is rotatably supported by the rear end of the rear wheel suspension 30.

The body frame 20 includes a pair of main frames 21, a cross member 22, a sub frame 23, a seat frame 24 and a side frame 25. The main frames 21 extend rearward and downward from a head pipe not shown. The cross member 22 connects the intermediate portions of the main frames 21 in the vehicle-widthwise direction. The sub frame 23 is joined to the upper portion of the main frames 21 and to the upper surface of the cross member 22. The seat frame 24 is joined at a front end portion thereof to the sub frame 23 and extends rearward. The side frame 25 includes a front end portion connected to the bent portions of the main frames 21 and a rear end portion joined to the rear end portion of the seat frame 24.

Referring to FIG. 2, the rear wheel suspension 30 includes a swing arm 40 swingably supported by the main frames 21. A rear cushion 50 absorbs shock acting on the rear wheel 12. A power transmission portion 31 transmits a drive force from the power unit 11 to the rear wheel 12.

The power transmission portion 31 is connected through a drive shaft 13 to an output shaft 11*a* provided at the rear end of the power unit 11. In addition, the power transmission portion 31 includes a drive gear case 32 and a rear wheel support 33 both connected to the swing arm 40. An input shaft 34 is rotatably supported by the drive gear case 32 and is connected to the drive shaft 13. A rear axle 35 is rotatably supported by the drive gear case 32 and by the rear wheel support plate 33 and is attached with the rear wheel 12 thereon. A bevel gear mechanism (not shown) is incorporated in the drive gear case 32 so as to transmit to the rear axle 35 a drive force inputted from the drive shaft 13 to the input shaft 34. With this configuration, the drive force of the power unit 11 is transmitted through the output shaft 11*a*, drive shaft 13, input shaft 34 and bevel gear mechanism to the rear axle 35 for drivingly rotating the rear wheel 12.

The swing arm 40 includes an upper arm 41 and a lower arm 42. The upper arm 41 swingably connects the main frame 21 with the upper portion of the power transmission portion 31. The lower arm 42 swingably connects the main frame 21 with the lower portion of the power transmission portion 31.

As shown in FIGS. 1 and 3, the upper arm 41 includes a cylindrical pivot pipe 60, a left upper arm 61, a right upper arm 62, bifurcate connection plates 63, a cross member 64, and cushion attachment portions 65, 65. The pivot pipe 60 is swingably connected to the main frame 21 via the first support shaft 43. The left upper arm 61 is disposed on the left side of the vehicle body to extend rearward from the left end portion of the pivot pipe 60. The right upper arm 62 is disposed on the right side of the vehicle body to extend rearward from the right end portion of the pivot pipe 60. The connection plates 63 are formed at the rear end portions of the left and right upper arms 61, 62 to swingably connect the drive gear case 32 with the rear wheel support plate 33 by use of the connection bolt 44. The cross member 64 connects the intermediate portions of the left and night upper arms 61, 62 in the vehicle-widthwise direction. The cushion attachment portions 65, 65 are integrally formed to extend downward from the central portion of the pivot pipe 60 and swingably support the upper end portion of the rear cushion 50. The pivot pipe 60 is internally provided with a needle-like roller bearing 60*a*, ball bearings 60*b*, 60*b*, collar members 60*c*, 60*d*, 60*e*, and seal members 60*f*, 60*f* interposed between the first support shaft 43 and the pivot pipe 60. The connection plates 63 are each formed with an insertion hole 63*a* adapted to receive the connection bolt 44 inserted thereinto and with an internal thread portion 63*b* adapted to fasten the connection bolt 44 thereto. The cushion attachment portions 65 are each formed with an insertion hole 65*a* adapted to receive an attachment bolt 56 described later inserted thereinto.

At the front end of the upper arm 41, the pivot pipe 60 is swingably supported by the intermediate portion of the main frame 21 via the first support shaft 43. An upper connection arm 32*a* formed at the upper portion of the drive gear case 32 is swingably connected to the connection plates 63 of the left upper arm 61 via the connection bolt 44. An upper connection arm 33*a* formed at the upper portion of the rear wheel support plate 33 is swingably connected to the connection plates 63 of the right upper arm 62 via the connection bolt 44. A collar member and a bushing member (not shown) are interposed between the connection bolt 44 and each of the upper connection arms 32*a*, 33*a*.

As shown in FIGS. 1 and 4, the lower arm 42 includes a cylindrical pivot pipe 70, a left lower arm 71, a right lower arm 72, bifurcate connection plates 73, a cross member 74, and cushion brackets 75, 75. The pivot pipe 70 is swingably connected to the main frame 21 via the second support shaft 45. The left lower arm 71 is disposed on the left side of the vehicle body to extend rearward from the left end portion of the pivot pipe 70. The right lower arm 72 is disposed on the right side of the vehicle body to extend rearward from the right end portion of the pivot pipe 70. The connection plates 73 are formed at the rear end portions of the left and right upper arms 71, 72 to swingably connect the drive gear case 32 with the rear wheel support plate 33 by use of the connection bolt 46. The cross member 74 connects the intermediate portions of the left and right upper arms 71, 72 in the vehicle-widthwise direction. The cushion brackets 75, 75 are integrally formed on the upper surface of the approximately central portion of the cross member 74 to swingably support the lower end portion of the rear cushion 50. The pivot pipe 70 is internally provided with a needle-like roller bearing 70*a*, ball bearings 70*b*, 70*b*, collar members 70*c*, 70*d*, 70*e*, and seal members 70*f*, 70*f* interposed between the second support shaft 45 and the pivot pipe 70. The connection plates 73 are each formed with an insertion hole 73*a* adapted to receive the connection bolt 46 inserted thereinto and with an internal thread portion 73*b* adapted to fasten the connection bolt 46 thereto. The cushion brackets 75 are each formed with an insertion hole 75*a* adapted to receive an attachment bolt 57 described later inserted thereinto.

As shown in FIG. 4, in the present embodiment, the left lower arm 71 is formed in an upwardly curved shape and the right lower arm 72 is formed in a downwardly curved shape.

At the front end of the lower arm 42, the pivot pipe 70 is swingably supported by the lower end portion of the main frame 21 via the second support shaft 45. A lower connection arm 32*b* formed at the lower portion of the drive gear case 32 is swingably supported by the connection plates 73 of the left lower arm 71 via the connection bolt 46. A lower connection arm 33*b* formed at the lower portion of the rear wheel support plate 33 is swingably connected to the connection plates 73 of the right lower arm 72 via the connection bolt 46. Incidentally, a collar member and a bushing member not shown are interposed between the connection bolt 46 and each of the lower connection arms 32*b*, 33*b*.

As shown in FIGS. 5 and 6, the rear cushion 50 includes a damper cylinder 51. A piston rod 52 is inserted into the damper cylinder 51. A suspension spring 53 is interposed between the damper cylinder 51 and the piston rod 52. An upper connection portion 54 which is an upper end portion of the rear cushion 50 is provided at the upper end portion of the damper cylinder 51. A lower connection portion 55 which is a lower end portion of the rear cushion 50 is provided at the lower end portion of the piston rod 52.

The upper connection portion 54 of the rear cushion 50 is swingably connected to the cushion attachment portion 65 of the upper arm 41 via the attachment bolt 56. As shown in FIG. 5, the axial center P1 of the pivot pipe 60 is disposed above the axial center P2 of the insertion hole 63*a* of the connection plate 63 viewed from the side. The pivot axial center P3 of the cushion attachment portion 65 is disposed forward of the axial center P1 of the pivot pipe 60 with respect to the vehicle. The attachment bolt 56 connecting the upper connection portion 54 of the rear cushion 50 is swingably supported by the cushion attachment portion 65 of the upper arm 41 at a position forward of the first support shaft 43 connecting the upper arm 41 with the main frame 21 by a predetermined distance Z with respect to the vehicle.

The lower connection portion 55 of the rear cushion 50 is swingably connected to the cushion brackets 75 of the lower arm 42 by the attachment bolts 57. As shown in FIG. 5, the axial center P4 of the pivot pipe 70 is disposed above the axial center P5 of the insertion hole 73*a* of the connection plate 73. The pivot axial center P6 of the cushion bracket 75 is disposed rearward of the axial center P4 of the pivot pipe 70 with respect to the vehicle.

The upper connection portion 54 is swingably connected to the cushion attachment portion 65 of the upper arm 41 and the lower connection portion 55 is swingably connected to cushion bracket 75 of the lower arm 42; therefore, the rear cushion 50 is disposed at an approximately central position, in the vehicle-widthwise direction, of the left and right upper arms 61, 62 and of the left and right lower arms 71, 72.

Referring to FIGS. 2 and 5, the rear cushion 50 includes a damping force adjusting mechanism 80'. A damping force adjusting portion 81' of the damping force adjusting mechanism 80' is provided at the lower connection portion 55 of the rear cushion 50 so as to face the front of the vehicle. Thus, since the damping force adjusting mechanism 80' can be adjusted without being influenced by the lower arm 42, the damping force of the rear cushion 50 can be adjusted without removal of the rear cushion 50 from the swing arm 40.

A description is next made of the operation of the rear wheel suspension 30 according to the present embodiment with reference to FIGS. 5 and 6. Incidentally, a portion of the body frame, the power unit, the drive shaft and the rear wheel are omitted in FIGS. 5 and 6.

Referring to FIGS. 5 and 6, when the power transmission portion 31 together with the rear wheel is moved upward due to shock or the like from the road surface in the rear wheel suspension 30 of the present embodiment, the upper arm 41 and lower arm 42 are swung around the first support shaft 43 and the second support shaft 45, respectively. At this time, along with the swing of the upper arm 41, the cushion attachment portion 65 is moved rearward along a circular arc around the first shaft 43. In addition, along with the swing of the lower arm 42, the cushion bracket 75 is moved rightward and upward along a circular arc around the second support shaft 45. Thus, the rear cushion 50 is pressed along the axial direction of the piston rod 52 for expansion and contraction, whereby the shock acting on the rear wheel 12 is damped and absorbed by the rear cushion 50.

As described above, according to the rear wheel suspension 30 of the motorcycle 10 of the present embodiment, the swing arm 40 includes the upper arm 41 that swingably connects the body frame 20 with the upper portion of the power transmission portion 31. The lower arm 42 swingably connects the body frame 20 with the lower portion of the power transmission portion 31. The axial center of the upper end support portion of the rear cushion 50 is swingably supported by the upper arm 41 at a position forward of the axial center of the pivot pipe 60 swingably supporting the upper arm 41 with respect to the body frame 20 of the vehicle. In addition, the axial center of the lower support portion of the rear cushion 50 can swingably be supported by the lower arm 42 at a position rearward of the axial center of the pivot pipe 70 swingably supporting the lower arm 42 with respect to the body frame 20 of the vehicle. Thus, the stroke of the rear cushion 50 can sufficiently be ensured. Since the rear cushion 50 can be disposed at the lower portion of the vehicle body, the gravity center of the vehicle 10 can be lowered, thereby improving the traveling performance of the vehicle 10.

According to the rear wheel suspension 30 of the motorcycle 10 of the present embodiment, the upper arm 41 is formed integrally with the cushion attachment portion 65 swingably supporting the upper end portion of the rear cushion 50. Thus, the rear cushion 50 is swung along with the swing of the swing arm 40 to smoothly absorb shock acting on the rear wheel 12, thereby improving the traveling performance of the vehicle 10.

According to the rear wheel suspension 30 of the motorcycle 10 of the present embodiment, the upper arm 41 includes the left upper arm 61 disposed on the left side of the vehicle body and the right upper arm 62 disposed on the right side of the vehicle body. The lower arm 42 includes the left lower arm 71 disposed on the left side of the vehicle body and the right lower arm 72 disposed on the right side of the vehicle body. The rear cushion 50 is disposed at an approximately central position, in the vehicle-widthwise direction, of the left and right upper arms 61, 62 and of the left and right lower arms 71, 72. Thus, the rear cushion 50 smoothly absorbs shock acting on the rear wheel 12, so the traveling performance of the vehicle 10 can be improved.

According to the rear wheel suspension 30 of the motorcycle 10 of the present embodiment, the rear cushion 50 includes the damping force adjusting mechanism 80', and the damping force adjusting portion 81' of the damping adjusting mechanism 80' is provided on a lower portion of the rear cushion 50 so as to face the front of the vehicle. Thus, the damping force of the rear cushion 50 can be adjusted without being influenced by the lower arm 42 of the swing arm 40.

According to the rear wheel suspension 30 or the motorcycle 10 of the present embodiment, the left lower arm 71 is formed in a downwardly curved shape and the right lower arm 72 is formed in an upwardly curved shape. It is possible, therefore, to prevent stress concentration from occurring at the lower arm 42, thereby improving the endurance of the rear wheel suspension 30.

The present invention is not limited to the exemplified embodiment described above and can appropriately be modified in various ways without departing from the spirit of the present invention.

For example, the embodiment described above exemplifies the case where the present invention is applied to a motorcycle having a drive-shaft drive. However, the present invention is not limited to this case and may be applied to a motorcycle having a chain drive.

Second Embodiment

Referring to FIG. 7, a motorcycle 10 according to a second embodiment of the present invention will be described. The motorcycle 10 includes a body frame 20. A power unit 11 is attached to the body frame 20 from below and includes an internal combustion engine and a transmission. A rear wheel suspension 30 is swingably supported by the lower portion of the body frame 20. A rear wheel 12 is rotatably supported by the rear end of the rear wheel suspension 30.

The body frame 20 includes a pair of main frames 21, a cross member 22, a sub frame 23, a seat frame 24 and a side frame 25. The main frames 21 extend rearward and downward from a head pipe not shown. The cross member 22 connects the intermediate portions of the main frames 21 in the vehicle-widthwise direction. The sub frame 23 is joined to the upper portion of the main frames 21 and to the upper surface of the cross member 22. The seat frame 24 is joined at a front end portion thereof to the sub frame 23 and extends rearward. The side frame 25 includes a front end portion connected to the bent portions of the main frames 21 and a rear end portion joined to the rear end portion of the seat frame 24.

Referring to FIG. 8, the rear wheel suspension 30 includes a swing arm 40 swingably supported by the main frames 21. A rear cushion 50 absorbs a shock acting on the rear wheel 12. A power transmission portion 31 transmits a drive force from the power unit 11 to the rear wheel 12.

The power transmission portion 31 is connected through a drive shaft 13 to an output shaft 11*a* provided at the rear end of the power unit 11. In addition, the power transmission portion 31 includes a drive gear case 32 and a rear wheel support 33 both connected to the swing arm 40. An input shaft 34 is rotatably supported by the drive gear case 32 and is connected to the drive shaft 13. A rear axle 35 is rotatably supported by the drive gear case 32 and by the rear wheel support plate 33 and is attached with the rear wheel 12 thereon. A bevel gear mechanism (not shown) is incorporated in the drive gear case 32 so as to transmit to the rear axle 35 a drive force inputted from the drive shaft 13 to the input shaft 34. With this configuration, the drive force of the power unit 11 is transmitted through the output shaft 11*a*, drive shaft 13, input shaft 34 and bevel gear mechanism to the rear axle 35 for drivingly rotating the rear wheel 12.

The swing arm 40 includes an upper arm 41 and a lower arm 42. The upper arm 41 is swingably supported by the main frame 21 via a first support shaft 43 and swingably connects the main frame 21 with the upper portion of the power transmission portion 31. The lower arm 42 is swingably supported by the main frame 21 via a second support shaft 45 and swingably connects the main frame 21 with the lower portion of the power transmission portion 31.

As shown in FIGS. 7 and 3, the upper arm 41 includes a cylindrical pivot pipe 60, a left upper arm 61, a right upper arm 62, bifurcate connection plates 63, a cross member 64, and cushion attachment portions 65, 65. The pivot pipe 60 is swingably connected to the main frame 21 via the first support shaft 43. The left upper arm 61 is disposed on the left side of the vehicle body to extend rearward from the left end portion of the pivot pipe 60. The right upper arm 62 is disposed on the right side of the vehicle body to extend rearward from the right end portion of the pivot pipe 60. The connection plates 63 are formed at the rear end portions of the left and right upper arms 61, 62 to swingably connect the drive gear case 32 with the rear wheel support plate 33 by use of the connection bolt 44. The cross member 64 connects the intermediate portions of the left and right upper arms 61, 62 in the vehicle-widthwise direction. The cushion attachment portions 65, 65 are integrally formed to extend downward from the central portion of the pivot pipe 60 and swingably support the upper end portion of the rear cushion 50. The pivot pipe 60 is internally provided with a needle-like roller bearing 60*a*, ball bearings 60*b*, 60*b*, collar members 60*c*, 60*d*, 60*e*, and seal members 60*f*, 60*f* interposed between the first support shaft 43 and the pivot pipe 60. The connection plates 63 are each formed with an insertion hole 63*a* adapted to receive the connection bolt 44 inserted thereinto and with an internal thread portion 63*b* adapted to fasten the connection bolt 44 thereto. The cushion attachment portions 65 are each formed with an insertion hole 65*a* adapted to receive an attachment bolt 56 described later inserted thereinto.

In the upper arm 41, the pivot pipe 60 is swingably supported by the intermediate portion of the main frame 21 via the first support shaft 43. An upper connection arm 32*a* formed at the upper portion of the drive gear case 32 is swingably connected to the connection plates 63 of the left upper arm 61 via the connection bolt 44. An upper connection arm 33*a* formed at the upper portion of the rear wheel support plate 33 is swingably connected to the connection plates 63 of the right upper arm 62 via the connection bolt 44. Referring to FIG. 10, the upper connection arm 32*a* (33*a*) is internally provided in the cylindrical portion thereof with collar members 90, 90, ball bearings 91, 91 and seal members 92, 92 interposed between the connection bolt 44 and the upper connection arm 32*a* (33*a*).

As shown in FIGS. 7 and 4, the lower arm 42 includes a cylindrical pivot pipe 70, a left lower arm 71, a right lower arm 72, bifurcate connection plates 73, a cross member 74, and cushion brackets 75, 75. The pivot pipe 70 is swingably connected to the main frame 21 via the second support shaft 45. The left lower arm 71 is disposed on the left side of the vehicle body to extend rearward from the left end portion of the pivot pipe 70. The right lower arm 72 is disposed on the right side of the vehicle body to extend rearward from the right end portion of the pivot pipe 70. The connection plates 73 are formed at the rear end portions of the left and right upper arms 71, 72 to swingably connect the drive gear case 32 with the rear wheel support plate 33 by use of the connection bolt 46. The cross member 74 connects the intermediate portions of the left and right upper arms 71, 72 in the vehicle-widthwise direction. The cushion brackets 75, 75 are integrally formed on the upper surface of the approximately central portion of the cross member 74 to swingably support the lower end portion of the rear cushion 50. The pivot pipe 70 is internally provided with a needle-like roller bearing 70*a*, ball bearings 70*b*, 70*b*, collar members 70*c*, 70*d*, 70*e*, and seal members 70*f*, 70*f* interposed between the second support shaft 45 and the pivot pipe 70. The connection plates 73 are each formed with an insertion hole 73*a* adapted to receive the connection bolt 46 inserted thereinto and with an internal thread portion 73*b* adapted to fasten the connection bolt 46 thereto. The cushion brackets 75 are each formed with an insertion hole 75*a* adapted to receive a attachment bolt 57 described later inserted thereinto.

At the front end of the lower arm 42, the pivot pipe 70 is swingably supported by the lower end portion of the main frame 21 via the second support shaft 45. A lower connection arm 32*b* formed at the lower portion of the drive gear case 32 is swingably supported by the connection plates 73 of the left lower arm 71 via the connection bolt 46. A lower connection arm 33*b* formed at the lower portion of the rear wheel support plate 33 is swingably connected to the connection plates 73 of the right lower arm 72 via the connection bolt 46. Referring to FIG. 10, the lower connection arm 32*b* (33*b*) is internally provided in the cylindrical portion thereof with collar members 90, 90, ball bearings 91, 91 and seal members 92, 92 interposed between the connection bolt 44 and the lower connection arm 32*b* (33*b*).

As shown in FIG. 7, the rear cushion 50 includes a damper cylinder 51. A piston rod 52 is inserted into the damper cylinder 51. A suspension spring 53 is interposed between the damper cylinder 51 and the piston rod 52. An upper connection portion 54 is provided at the upper end portion of the damper cylinder 51 so as to be connected to the cushion attachment portion 65 of the upper arm 41. A lower connection portion 55 is provided at the lower end portion of the piston rod 52 so as to be connected to the cushion bracket 75 of the lower arm 42. The rear cushion 50 is swingably assembled to the swing arm 40 by swingably connecting the upper connection portion 54 with the cushion attachment portion 65 of the upper arm 41 via the attachment bolt 56 and by swingably connecting the lower connection portion 55 with the cushion bracket 75 of the lower arm 42 via the attachment bolt 57.

Referring to FIG. 9, in the present embodiment, an adjuster mechanism 80 is disposed between the main frame 21 and each of both the axial ends of the pivot pipe 60 included in the upper arm 41, which are both the axial ends of the first support shaft 43. Another adjuster mechanism 80 is disposed between the main frame 21 and the right end portion of the pivot pipe 70 of the lower aim 42, which is one axial side of the second support shaft 45. The adjuster mechanisms 80 described above have the same structure. The vehicle-widthwise gap between main frame 21, the upper arm 41, and the lower arm 42 can be adjusted. The first support shaft 43 is disposed inside a triangle area S defined by the main frame 21, the seat frame 24 and the side frame 25 as viewed from the side of the vehicle body.

The adjuster mechanism 80 includes an adjuster bolt 81 and a lock nut 82. The adjuster bolt 81 is a cylindrical member and is formed on its inner circumferential surface with an insertion hole 83 adapted to receive each of the first and the second support shaft 43, 45 inserted thereinto and on its outer circumferential surface with an external thread portion 84 engaged threadedly with an internal thread portion 21*a* formed on the main frame 21. The adjuster bolt 81 is assembled to the main frame 21 by allowing the external thread portion 84 to threadedly engage the internal thread portion 21*a* of the main frame 21. The adjuster bolt 81 itself is turned to be movable in the axial direction. The lock nut 82 is threadedly engaged with the external thread portion 84 to fix the adjuster bolt 81 to the main frame 21 at an optional position.

A description is next made of an attachment procedure for the swing arm attachment structure of the motorcycle according to the present embodiment with reference to FIG. 9.

First, the external thread portion 84 of the adjuster bolt 81 is threadedly engaged with the lower side internal thread portion 21*a* of the right-hand main frame 21. Then, the pivot pipe 70 of the lower arm 42 is disposed between the pair of main frames 21, and the second support shaft 45 is inserted into the insertion hole 83 of the adjuster bolt 81 from the right side of the vehicle body, sequentially inserted into the collar member 70*c*, ball bearings 70*b*, 70*b*, collar member 70*d*, collar member 70*e* inside the pivot pipe 70 and into a pivot shaft hole 21*b* formed in the left side main frame 21. The nut 85 is threadedly engaged with the left end portion of the second support shaft 45.

Turning the adjuster bolt 81 allows the end face of the adjuster bolt 81 to push the collar member 70*c*, ball bearings 70*b*, 70*b*, collar member 70*d*, and collar member 70*e*, thereby moving the lower arm 42 to a position where the collar member 70*e* is brought into contact with the left side main frame 21 to vehicle-widthwise position the lower arm 42 and also to adjust the vehicle-widthwise gap between the lower arm 42 and each of the pair of main frames 21. Thereafter, the adjuster bolt 81 is fastened to the light side main frame 21 by the lock nut 82 and the left end portion of the second support shaft 45 is fastened to the left side main frame 21 by the nut 85.

The adjuster bolt 81 is then threadedly engaged with each of the upper side internal thread portions 21*a* of the pair of main frames 21. Then, the pivot pipe 60 of the upper arm 41 is disposed between the pair of main frames 21, the first support shaft 43 is inserted into the insertion hole 83 of the adjuster bolt 81 from the right side of the vehicle body, sequentially inserted into the insertion hole 83 of the adjuster bolt 81 threadedly engaged with the collar member 60*c*, ball bearings 60*b*, 60*b*, collar member 60*d*, collar member 60*e* inside the pivot pipe 60 and the left side main frame 21. The nut 85 is threadedly engaged with the left end portion of the first support shaft 43.

Turning both, i.e., the left and right, adjuster bolts 81, 81 allow the end faces of the adjuster bolt 81, 81 to push the collar member 60*c*, ball bearings 60*b*, 60*b*, collar member 60*d*, and collar member 60*e*. In this way, the vehicle-widthwise position of the upper arm 41 is aligned with the position of the lower arm 42 so as not to cause the vehicle-widthwise positional displacement between the upper arm 41 and the lower arm 42. In addition, the vehicle-widthwise gap between each of the pair of main frames 21 and the upper arm 41. Thereafter, the adjuster bolts 81, 81 are fastened to the pair of main frames 21 by the lock nuts 82, 82, respectively, and the left end portion of the first support shaft 43 is fastened to the left side main frame 21 by the nut 85.

As described above, according to the swing arm attachment structure for a motorcycle according to the present embodiment, the swing arm 40 includes the upper arm 41 swingably supported by the body frame 20 via the first support shaft 43 and swingably connecting the body frame 20 with the upper portion of the power transmission portion 31. The lower arm 42 is swingably supported by the body frame 20 via the second support shaft 45 and is swingably connecting the body frame 20 with the lower portion of the power transmission portion 31. The adjuster mechanisms 80 are disposed on both the axial sides of the first support shaft 43 so as to be able to adjust the vehicle-widthwise gap between the body frame 20 and the upper frame 41. In addition, the adjuster mechanism 80 is disposed on the one axial side of the second support shaft 45 so as to be able to adjust the vehicle-widthwise gap between the body frame 20 and the lower arm 42. The vehicle-widthwise gap between the body frame 20 and the lower arm 42 is adjusted by the adjuster mechanism 80 located on the lower arm 42. Thereafter, the vehicle-widthwise gap between the body frame 20 and the upper arm 41 can be adjusted while the vehicle-widthwise position of the upper arm 41 is aligned with the position of the lower arm 42 by the adjuster mechanisms 80, 80 located on the side of the upper arm 41. Thus, even if the swing arm 40 is of a parallel link structure, the vehicle-widthwise gap between the body frame 20 and the swing arm 40 can efficiently be adjusted, thereby improving the assembly performance of the swing arm 40.

According to the swing aim attachment structure for a motorcycle according to the present embodiment, the adjuster mechanism 80 includes the adjuster bolt 81 which is formed on its inner circumferential surface with the insertion hole 83 adapted to receive the first or second support shaft 43 or 45 inserted thereinto and on its outer circumferential surface with the external thread portion 84 threadedly engaged with the internal thread portion 21*a* formed on the body frame 20. The lock nut 82 is threadedly engaged with the internal thread portion 21*a* formed on the body frame 20 to fix the adjuster bolt 81 to the body frame 20. Thus, the vehicle-widthwise position of the swing arm 40 and the vehicle-widthwise gap between the body frame 20 and the swing arm 40 can be adjusted with ease, thereby improving the assembly performance of the swing arm 40.

According to the swing arm attachment structure for a motorcycle according to the present embodiment, the body frame 20 includes the main frame 21 supporting the power unit 11; the seat frame 24 extending rearward from the approximately central portion, in the back and forth direction of the vehicle body, of the main frame 21. The side frame 25 extends rearward and upward from the rear end portion of the main frame 21. In addition, the first support shaft 43 is disposed inside the triangle area S defined by the main frame 21, the seat frame 24 and the side frame 25, as viewed from the side of the vehicle body. Thus, the attachment of the swing arm 40 and the gap adjustment can be performed easily and efficiently without interference with the frames and the like. Since the first support shaft 43 is disposed near the center of the vehicle body, the total length of the vehicle body can be reduced and weight balance of the vehicle can be improved to enhance traveling performance.

The present invention is not limited to the exemplified embodiment described above and can appropriately be modified in various ways without departing from the spirit of the present invention.

For example, in the present embodiment, the adjuster mechanism 80 disposed on one axial side of the second support shaft 45 is disposed on the right end portion of the second support shaft 45. However, the present invention is not limited to this. The adjuster mechanism 80 may be disposed on the left end portion of the second support shaft 45.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear wheel suspension for a motorcycle, comprising:

a swing arm swingably supported by a body frame;

a rear cushion for absorbing shock acting on a rear wheel; and a power transmission portion for transmitting a drive force from a power unit to the rear wheel;

wherein the swing arm includes:

an upper arm swingably connecting the body frame with an upper portion of the power transmission portion; and a lower arm swingably connecting the body frame with a lower portion of the power transmission portion, wherein an axial center of an upper end support portion of the rear cushion is swingably supported by the upper arm at a position forward of an axial center of a first pivot pipe swingably supporting the upper arm with respect to the body frame of the vehicle, and an axial center of a lower end support portion of the rear cushion is swingably supported by the lower arm at a position rearward of an axial center of a second pivot pipe swingably supporting the lower arm with respect to the body frame of the vehicle, and wherein the lower arm includes a left lower arm disposed on the left side of the vehicle and a right lower arm disposed on the right side of the vehicle, and wherein one of the left lower arm and the right lower arm is formed in a downwardly curved shape and the other is formed in an upwardly curved shape.

2. The rear wheel suspension for a motorcycle according to claim 1, wherein the upper arm is formed integrally with a cushion attachment portion for swingably supporting an upper end portion of the rear cushion.

3. The rear wheel suspension for a motorcycle according to claim 2, wherein the upper arm includes a left upper arm disposed on the left side of the vehicle and a right upper arm disposed on the right side of the vehicle, and the rear cushion is disposed at an approximately central position, in a vehicle-widthwise direction, of the left and right upper arms and of the left and right lower arms.

4. The rear wheel suspension for a motorcycle according to claim 2, wherein the rear cushion includes a damping force adjusting mechanism and a damping force adjusting portion of the damping force adjusting mechanism is provided below the rear cushion to face the front of the vehicle.

5. The rear wheel suspension for a motorcycle according to claim 1, wherein the upper arm includes a left upper arm disposed on the left side of the vehicle and a right upper arm disposed on the right side of the vehicle, and the rear cushion is disposed at an approximately central position, in a vehicle-widthwise direction, of the left and right upper arms and of the left and right lower arms.

6. The rear wheel suspension for a motorcycle according to claim 1, wherein the rear cushion includes a damping force adjusting mechanism, and a damping force adjusting portion of the damping force adjusting mechanism is provided on a lower portion of the rear cushion to face the front of the vehicle.

7. A swing arm attachment structure for a motorcycle, comprising:

a body frame;

a swing arm swingably supported by the body frame; and a power transmission portion for transmitting a drive force from a power unit to a rear wheel;

wherein the swing arm includes:

an upper arm swingably supported by the body frame via a first support shaft and swingably connecting the body frame with an upper portion of the power transmission portion; and a lower arm swingably supported by the body frame via a second support shaft and swingably connecting the body frame with a lower portion of the power transmission portion, wherein the lower arm includes a left lower arm disposed on the left side of the vehicle and a right lower arm disposed on the right side of the vehicle, and wherein one of the left lower arm and the right lower arm is formed in a downwardly curved shape and the other is formed in an upwardly curved shape;

wherein adjuster mechanisms are respectively disposed on both axial sides of the first support shaft so as to be able to adjust a vehicle-widthwise gap between the body frame and the upper frame, another adjuster mechanism is disposed on one axial side of the second support shaft so as to be able to adjust a vehicle-widthwise gap between the body frame and a lower arm, and no adjuster mechanism is disposed on another axial side of the second support shaft.

8. The swing arm attachment structure for a motorcycle according to claim 7, wherein each of the adjuster mechanisms includes:

an adjuster bolt comprising an insertion hole formed on an inner circumferential surface thereof adapted to receive the first or second support shafts inserted thereinto, and an external thread portion on an outer circumferential surface thereof threadedly engaged with an internal thread portion formed on the body frame; and a lock nut which is threadedly engaged with the external thread portion of the adjuster bolt to fix the adjuster bolt to the body frame.

9. The swing arm attachment structure for a motorcycle according to claim 8, the body frame including:

a main frame supporting the power unit;

a seat frame extending rearward from an approximately central portion, in the back and forth direction of a vehicle body, of the main frame; and a side frame extending rearward and upward from a rear end portion of the main frame, wherein the first support shaft is disposed inside a triangle area defined by the main frame, the seat frame and the side frame, as viewed from the side of the vehicle body.

10. The swing arm attachment structure for a motorcycle according to claim 7, the body frame including:

a main frame supporting the power unit;

a seat frame extending rearward from an approximately central portion, in the back and forth direction of a vehicle body, of the main frame; and a side frame extending rearward and upward from a rear end portion of the main frame, wherein the first support shaft is disposed inside a triangle area defined by the main frame, the seat frame and the side frame, as viewed from the side of the vehicle body.

* * * * *